US007230223B2

(12) United States Patent
Jespersen et al.

(10) Patent No.: US 7,230,223 B2
(45) Date of Patent: Jun. 12, 2007

(54) SENSING SYSTEM FOR ASCERTAINING CURRENCY CONTENT OF ATM

(75) Inventors: Gunnar Jespersen, Aberdeen (GB); Eric G. Lyons, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/224,178

(22) Filed: Sep. 12, 2005
(Under 37 CFR 1.47)

(65) Prior Publication Data

US 2006/0104497 A1 May 18, 2006

(30) Foreign Application Priority Data

Sep. 14, 2004 (GB) ................................ 0420441.8

(51) Int. Cl.
*G01C 21/02* (2006.01)
*G07F 11/00* (2006.01)

(52) U.S. Cl. ......................... 250/206.1; 221/6; 902/13; 902/14

(58) Field of Classification Search ............. 250/206.1, 250/559.4; 902/13, 14; 221/6
See application file for complete search history.

(56) References Cited

U.S. PATENT DOCUMENTS 4,531,230 A * 7/1985 Brogardh .................... 382/187
4,715,714 A 12/1987 Gaechter et al.
4,756,621 A 7/1988 Sagara
6,100,993 A 8/2000 Eom
6,208,375 B1 * 3/2001 Kay et al. ..................... 348/95
7,000,832 B2 * 2/2006 Washington et al. ........ 235/380
2002/0079361 A1 6/2002 Kosugi

FOREIGN PATENT DOCUMENTS

EP 1 304 664 A2 4/2003
EP 1 548 662 A2 6/2005
GB 995076 6/1965
GB 2 151 778 A 7/1985
GB 2 386 189 A 9/2003

* cited by examiner

*Primary Examiner*—Thanh X. Luu
*Assistant Examiner*—Brian Livedalen
(74) *Attorney, Agent, or Firm*—Gregory A. Welte

(57) ABSTRACT

A sensing arrangement (12) is described. The arrangement comprises: a moveable object (80) including a plurality of marker portions (112) disposed in a calibrated configuration, each marker portion (112) being capable of emitting light in response to stimulation. The arrangement also includes a light source (42) directed towards the marker portions (112) and for causing light emission therefrom. An imaging device (44) is directed towards the marker portions (112) and includes an array of light-detecting elements for sensing light emitted from the marker portions (112) to generate image data. A processor (52), in communication with the imaging device (44), analyses image data received from the imaging device (44) to determine the location of the moveable object (80) based on the calibrated configuration.

19 Claims, 4 Drawing Sheets

SENSING SYSTEM FOR ASCERTAINING CURRENCY CONTENT OF ATM

BACKGROUND

The present invention relates to a sensing arrangement for detecting the position of a moveable device. In particular, the invention relates to a sensing arrangement incorporated in a media handler to detect the position of a moveable device and thereby determine the number of media items in the media handler. The invention also relates to a self-service terminal, such as an automated teller machine (ATM), incorporating a media handler.

Media handlers are well known in Self-Service Terminals (SSTs) such as ticket dispensers, photocopiers, ATMs, and such like. In an ATM, a media handler may be a banknote or cheque depository, a currency recycler, or a currency dispenser.

A conventional currency dispenser accommodates a currency cassette removably installed therein. In operation, the currency dispenser removes banknotes from the cassette on a per banknote basis. When the number of banknotes remaining is less than a predetermined number, the cassette should be removed and replenished with banknotes.

At present, some replenishment organizations replenish currency cassettes at preset time intervals rather than when the number of banknotes remaining falls below a predetermined level. This is partly because of the lack of a simple, low cost, efficient, and accurate way of determining the approximate number of banknotes remaining in a cassette without an operator visiting the ATM in which the currency dispenser is housed.

SUMMARY

It is among the objects of an embodiment of the present invention to obviate or mitigate one or more of the above disadvantages, or other disadvantages associated with prior art sensing arrangements and/or media handlers.

According to a first aspect of the present invention there is provided a sensing arrangement, the arrangement comprising: a moveable object including a plurality of marker portions disposed in a calibrated configuration, each marker portion being capable of emitting light in response to stimulation; a light source directed towards the marker portions and for causing light emission therefrom; an imaging device directed towards the marker portions and including an array of light-detecting elements for sensing light emitted from the marker portions to generate image data; and a processor, in communication with the imaging device, for analyzing image data received therefrom to determine the location of the moveable object based on the calibrated configuration.

In one embodiment, the plurality of marker portions comprises a series of lines spaced apart by a fixed distance. The series may include, for example, five or ten lines, and may serve as a graticule, where the spacing between the lines provides the calibrated configuration.

In an alternative embodiment, the marker portions may be different parts of a single marker having a predetermined shape, where the shape of the marker provides the calibrated configuration. For example, the marker may have an annular shape (either circular or non-circular, where non-circular includes multi-sided shapes such as polygons), where the size of the aperture in the annulus provides the calibrated configuration. In such an embodiment, the marker portions are diametrically opposite parts of the annulus. It will now be apparent that it is possible to use many different types of shape to provide the marker portions, including a square, a rectangle, a polygon, a cross, and an irregular shape. The important issue is that the shape that is used has marker portions separated by a known relationship (the calibrated configuration).

The light source may cause light emission from the marker portions by stimulating the marker portions, or by providing light that is reflected by the marker portions. As used herein, light emission includes the marker portions generating light in response to stimulation and also the marker portions reflecting light received from the light source.

The processor preferably has associated firmware, which may be resident in non-volatile storage such as NVRAM. The associated firmware may include an algorithm enabling the processor to calculate the number of pixels separating (or constituting) the marker portions, and to apply a scaling function, or access a table, to determine the distance between the imaging device and the marker portions that this number of pixels corresponds to.

Alternatively, the associated firmware may include an algorithm enabling the processor to determine from how many markers light is detected.

In one embodiment, the moveable object is a pusher plate mounted within a currency cassette. In other embodiments, however, the moveable object may be any other moving part in a media handler or other device.

In embodiments in which the position of the moveable object is associated with a number of media items, the processor may include an algorithm for determining the number of media items based on the moveable object position. It should be appreciated that this number may, for example, be in the range from zero to several thousand.

Preferably, the processor controls operation of the light source. The processor may also control operation of a media handler in which the sensing arrangement is mounted, for example, by controlling movement of a pick arm, rotation of rollers, advancing transport belts, and such like.

The moveable object may move from a first position, distal (away from the centre of) the imaging device to a second position, proximal (near the centre of) the imaging device. In embodiments where the moveable object relates to the number of media items stored in the media handler, the first position may correspond to the position in which the media handler is full (or empty), and the second position may correspond to the position in which the media handler is empty (or full). For currency cassette embodiments, the first position typically corresponds to the full position; whereas, for currency deposit embodiments the first position typically corresponds to the empty position.

It should be appreciated that the resolution of the imaging device should be sufficient so that different pixels detect the marker portions when the moveable object is in the first position compared with when the moveable object is in the second position. The field of view of the imaging device should also be sufficient to detect the marker portions.

Embodiments within this aspect of the present invention use the fact that as a moveable object approaches the imaging device, an increasing number of pixels separate the pixels that sense opposing marker portions.

As a result of this aspect of the invention a simple, low cost sensing arrangement is provided that enables the position of a moveable object to be determined without requiring the moveable object to have an electrically powered indicator.

A media handler according to this aspect of the invention may co-operate with a self-service terminal that provides status information to a remote networked management centre, thereby allowing a remote replenisher to be updated with information about the media items stored within the media handler.

According to a second aspect of the present invention there is provided a media cassette for use in a media handler, the cassette comprising: a moveable object including a plurality of marker portions disposed in a calibrated configuration, each marker portion being capable of emitting light in response to stimulation; a shutter disposed at one end of the cassette and retractable on insertion of the cassette into the media handler to provide an unobstructed light path from the marker portions to an imaging device in the media handler thereby enabling the imaging device to determine the location of the moveable object.

Preferably, the moveable object is a pusher plate for urging media items to one end of the cassette. Alternatively, the moveable object may be a part that is moved (for example, raised) by media items as successive media items are inserted into the cassette.

Preferably, the shutter is used as an exit port through which media items are dispensed.

The cassette may include a lid securely closeable against a body to prevent tampering or unauthorized access to the cassette. Alternatively, the cassette may be an open hopper without a lid.

Preferably, the marker portions are disposed on the pusher plate.

In one embodiment, the marker portions comprise luminescent material. Luminescence, as used herein, relates to emission of light that persists for a sufficient amount of time to allow detection of that light. Luminescence is used herein in a relatively broad sense and includes phosphorescence. Luminescence may be stimulated by any convenient means, for example, optical, magnetic, chemical, electrical or otherwise. In many embodiments, optical stimulation is preferred as this does not require any electrical connection with the marker portions.

In another embodiment, the marker portions comprise reflective material.

According to a third aspect of the present invention there is provided a media handler incorporating the sensing arrangement according to the first aspect of the invention.

The media handler may be a media dispenser, a currency recycler, a depository, or such like.

The media handler may be a module that is removably incorporated into a Self-Service Terminal such as an ATM, a photocopier, or a ticket kiosk.

The SST may relay information about how many media items are present to a management centre and/or a replenishment organization. The management centre or replenishment organization may be located remote from the media handler.

According to a fourth aspect of the present invention there is provided a method of sensing a moveable object, the method comprising: directing light towards a moveable object including a plurality of marker portions disposed in a calibrated configuration, each marker portion being capable of emitting light in response to stimulation; sensing light emitted from the marker portions; generating image data based on the sensed light; analyzing the image data; and determining the location of the moveable object based on the calibrated configuration.

The method may further comprise, estimating a number of media items using the location of the moveable object. This may be achieved by implementing an algorithm that performs a scaling function. Alternatively, this may be achieved by accessing a lookup table.

It will be appreciated that this method has applications outside media handlers, for example in complex machinery, industrial plants, vehicles, and many other applications.

According to a fifth aspect of the present invention there is provided a sensing arrangement, the arrangement comprising: a moveable object including a plurality of marker portions disposed in a calibrated configuration; an imaging device directed towards the marker portions and including an array of light-detecting elements for sensing light received from the marker portions to generate image data; and a processor, in communication with the imaging device, for analyzing image data received therefrom to determine the location of the moveable object based on the calibrated configuration.

The word "media" is used herein in a generic sense to denote one or more items, documents, or such like having a generally laminar sheet form; in particular, the word "media" when used herein does not necessarily relate exclusively to multiple items or documents. Thus, the word "media" may be used to refer to a single item (rather than using the word "medium") and/or to multiple items. The term "media item" when used herein refers to a single item or to what is assumed to be a single item. The word "object" is used herein in a broader sense than the word "media", and includes non-laminar items, such as parts of a media handler (for example, a pick arm, a purge pin, and a timing disc).

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
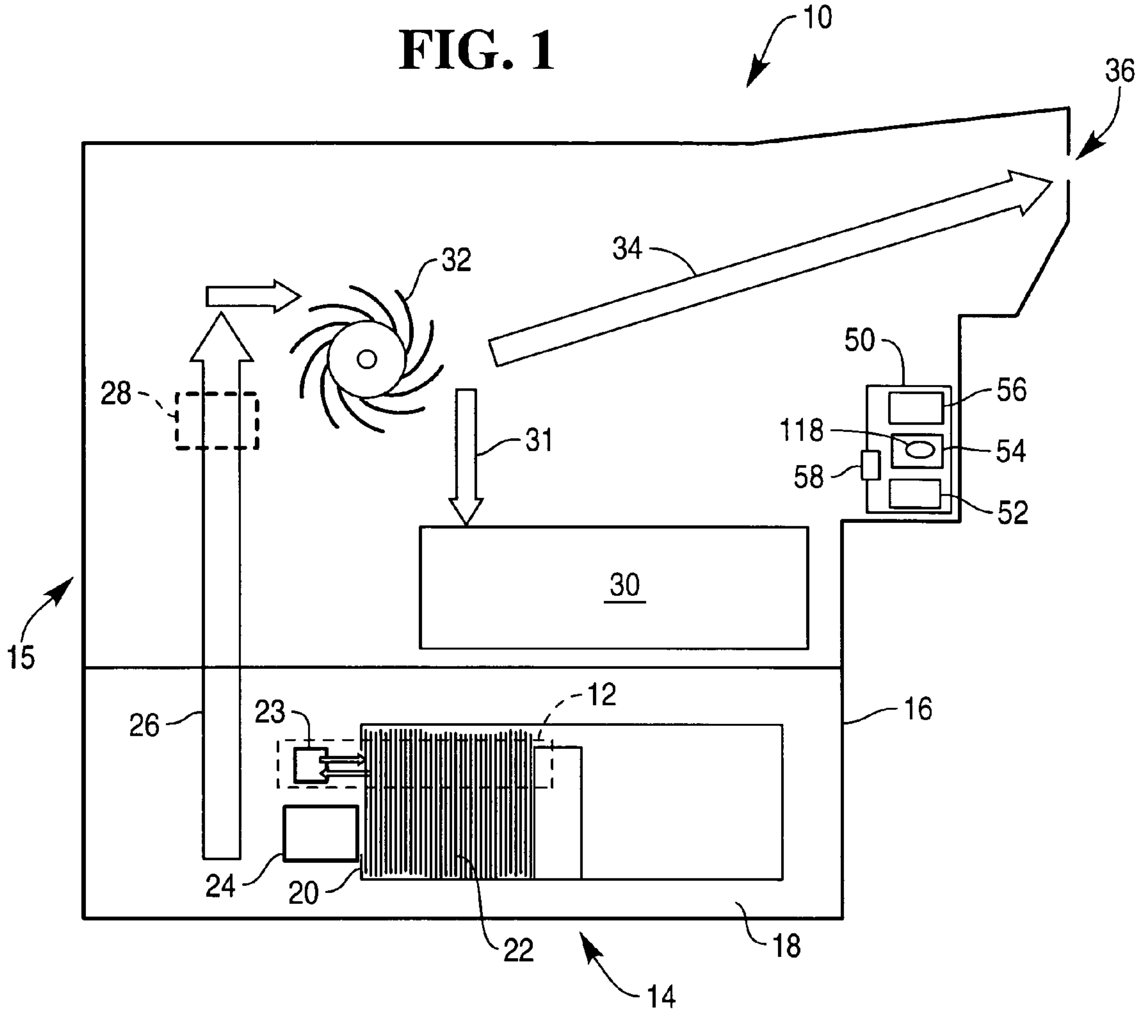
FIG. 1 is a simplified schematic side view of a media handler including a sensing arrangement according to one embodiment of the present invention, with parts of the dispenser simplified and other parts omitted for clarity.

Reference is now made to FIG. 1, which is a simplified schematic side view of a media handler 10 according to one embodiment of the present invention. The media handler 10 is in the form of a front access currency dispenser, and includes a sensing arrangement 12 (shown as a broken line) according to one embodiment of the present invention.

The currency dispenser 10 comprises a pick module 14 mounted beneath a presenter module 15 and releasably coupled thereto.

The pick module 14 has a chassis 16 into which a currency cassette 18 is slidably inserted. When in situ, the chassis 16 and cassette 18 co-operate to present an aperture (defined by a frame 20) in the cassette 18 through which banknotes 22 are picked. The pick module 14 includes a sensor station 23 and a pick unit 24 for picking individual banknotes 22 from the inserted currency cassette 18.

The currency dispenser 10 also has a transport arrangement 26 (shown as a block arrow for clarity) for transporting picked banknotes 22 from the pick module 14 to a note thickness sensing site 28 within the presenter module 15. The transport arrangement 26 may be implemented by any convenient mechanism. In this embodiment, a gear train is used as this enables an additional pick module to be coupled to the pick module 14. Other transport arrangements include stretchable endless belts, skid plates, and the like.

At the note thickness sensing site 28 the thickness of the transported banknote 22 is sensed to ensure that only one banknote has been picked. Suitable sensors may include one or more of linear variable differential transducers (LVDTs), optical sensors, strain gauge sensors, Hall effect sensors, capacitive sensors, and such like. In this embodiment an optical sensor is used.

At the sensing site 28, if multiple banknotes 22 have been picked in a single operation (that is, if a faulty pick has occurred), then these multiple banknotes are diverted to a purge bin 30 via a purge transport 31 (shown as a block arrow for clarity). The purge transport 31 is in the form of a pivoting belt that allows the banknotes to fall into the purge bin 30 under the influence of gravity. If only a single banknote 22 has been picked, then this banknote is directed towards a stacking wheel 32 for collating multiple individual banknotes into a bunch of banknotes. The bunch of banknotes is then transported by a bunch note presenter 34 (shown as a block arrow for clarity) from the stacking wheel 32 to an exit port 36 in the form of a shuttered aperture, thereby allowing a customer to remove the bunch of banknotes from the currency dispenser 10 via the exit port 36.

Figure 2:
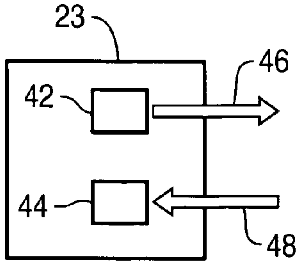
FIG. 2 is a block diagram illustrating one part of the media handler of FIG. 1 (the sensing arrangement) in more detail.

Referring now also to FIG. 2, which is a block diagram illustrating the sensing station of FIG. 1 in more detail, the sensing station 23 comprises a light source 42 in the form of one or more light emitting diodes, and an imaging device 44, in the form of a semiconductor including an array of light sensitive elements (pixels). One suitable type of imaging device 44 is a CMOS image sensor in the form of a National Semiconductor (trade mark) LM9630 100×128, 580 fps Ultra Sensitive Monochrome CMOS Image Sensor. The light source 42 radiates light (illustrated by arrow 46) into the currency cassette 18, and the CMOS sensor 44 detects light (illustrated by arrow 48) emitted from the currency cassette, as will be explained in more detail below.

The currency dispenser 10 includes a controller 50 for controlling the operation thereof. The controller 50 comprises: a processor 52 and associated RAM 54 for receiving and temporarily storing the output of the sensor 44; non-volatile memory 56, in the form of NVRAM for storing instructions for use by the processor 52 (the non-volatile memory 56 and instructions are collectively referred to herein as firmware); and a communications facility 58, in the form of a USB port, for communicating with an external control device (not shown). The external control device may be used for controlling operation of a self-service terminal in which the currency dispenser 10 is mounted.

The primary functions of the processor 52 are (i) to control operation of the dispenser 10 by activating and de-activating motors (not shown), and such like; and (ii) to capture and analyze data collected by the image sensor 44. Function (i) is well known to those of skill in the art, and will not be described in detail herein. Function (ii) is described in more detail below.

Figure 3A:
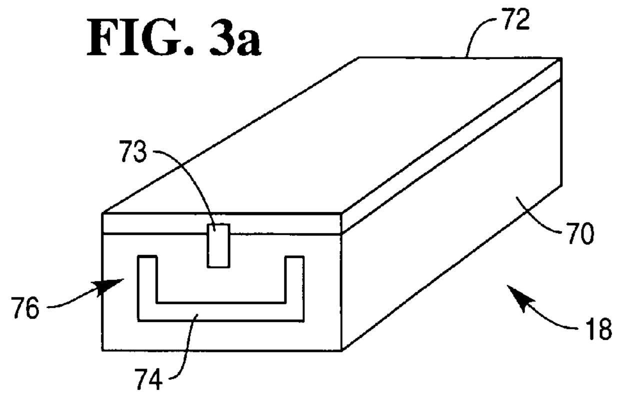
FIGS. 3*a* to 3*d* are schematic views of another part of the media handler of FIG. 1 (the currency cassette) in more detail.
Figure 3B:
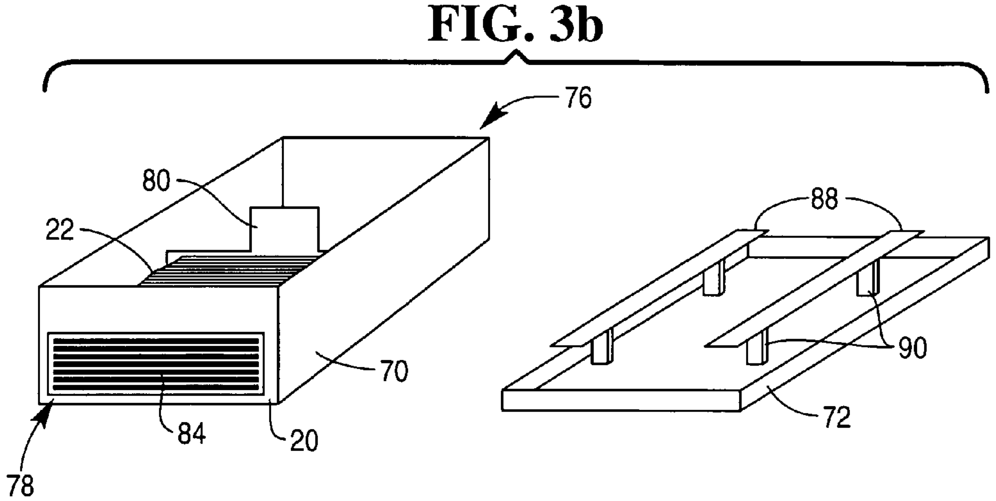
Figure 3C:
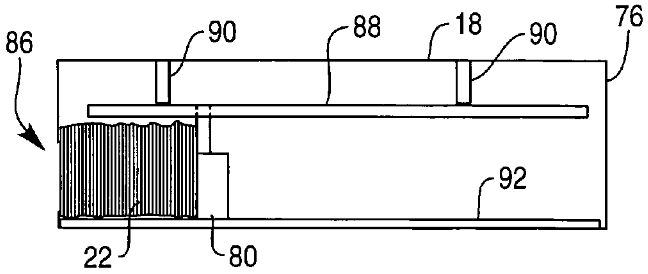
Figure 3D:
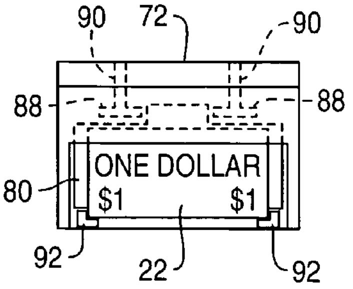

Reference is now also made to FIGS. 3*a* to 3*d*, which show the currency cassette 18 in more detail. FIG. 3*a* is a front perspective view of the cassette 18 comprising a body 70 and a lid 72 secured thereto by a latch 73. FIG. 3*b* is a rear perspective view of the cassette 18 with the lid 72 removed and inverted. FIG. 3*c* is a schematic side view of the cassette 18 with one sidewall removed for clarity. FIG. 3*d* is a rear elevation of the cassette 18.

The cassette 18 has a handle 74 at one end (the handle end 76) to allow the cassette 18 to be inserted into and removed from the dispenser 10, and to be carried between the dispenser 10 and a cash-in-transit vehicle (not shown). The cassette 18 also has a dispensing end 78 opposite the handle end 76 and through which banknotes 22 are removed for dispensing.

The cassette 18 comprises: a moveable object 80 in the form of a pusher plate; urging means (not shown) in the form of a spring-biased guide on which the pusher plate 80 is mounted; a door shutter 84 openable on insertion into the pick module 14 to reveal an aperture 86 defined by the frame 20 and through which banknotes 22 stored in the cassette 18 are removed.

The cassette further comprises banknote height guides 88 spatially separated from an underside of the lid 72 by spacers 90, and banknote width guides 92 on which the banknotes 22 rest and which reduce lateral movement of the banknotes 22.

Figure 4:
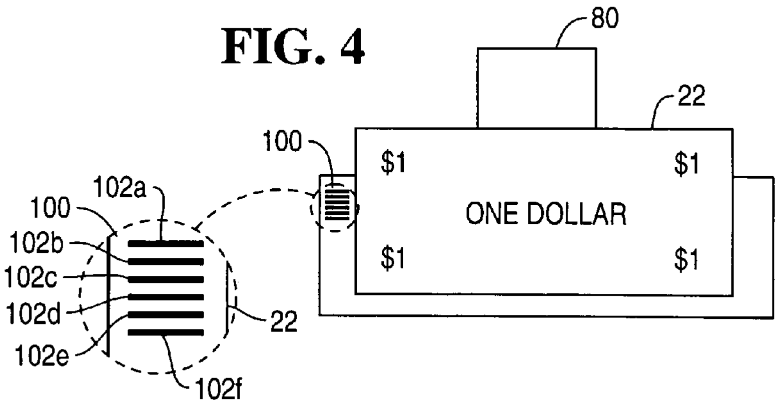
FIG. 4 is a schematic diagram showing part of the currency cassette of FIG. 3 (the pusher plate and marker portions) in more detail.

Reference is now also made to FIG. 4, which is a schematic diagram showing the pusher plate 80 in more detail. Pusher plate 80 includes an end portion 100 extending beyond banknotes 22 stored in the cassette 18 and visible to the sensing station 23 when the door shutter 84 is open (that is, the end portion 100 is visible through the aperture 86).

The end portion 100 includes a plurality of marker portions 102*a,b,c,d,e,f* in the form of fluorescent lines printed onto the pusher plate 80 in a calibrated configuration using fluorescent ink. In this embodiment, the calibrated configuration is a series of six lines spaced apart by one millimeter (1 mm). In this embodiment the marker portions 102 are located to one side of the banknotes to ensure that the marker portions 102 are visible to the sensing station 23.

When the currency cassette 18 is inserted into the pick module 14, the shutter door 84 is opened and the sensing station 23 has line of sight access to the marker portions 102. When this occurs, the controller 50 activates the LEDs 42 for a predetermined time period (typically of the order of a few tens of milliseconds) then de-activates the LEDs 42. The light emitted from the LEDs 42 stimulates the fluorescent lines 102 and the lines 102 emit light, which may persist for tens of milliseconds. This emitted light is detected by the CMOS sensor 44 and the resulting pixel data is conveyed to the controller 50 for processing.

At the controller 50, the processor 52 executes firmware that analyses the pixel data acquired to determine how many pixels separate the lines 102.

There are a number of different techniques that may be used to analyze data recorded by the pixels. This analysis may be for the purpose of determining the position of a moving object and/or to measure properties of an object and/or relations between objects.

In this example, single threshold analysis is used. This involves determining how many pixels in a physical area of the array receive light that exceeds a predetermined threshold. The threshold is set so that only those pixels that detect light from the marker portions 102 exceed the threshold.

Figure 5A:
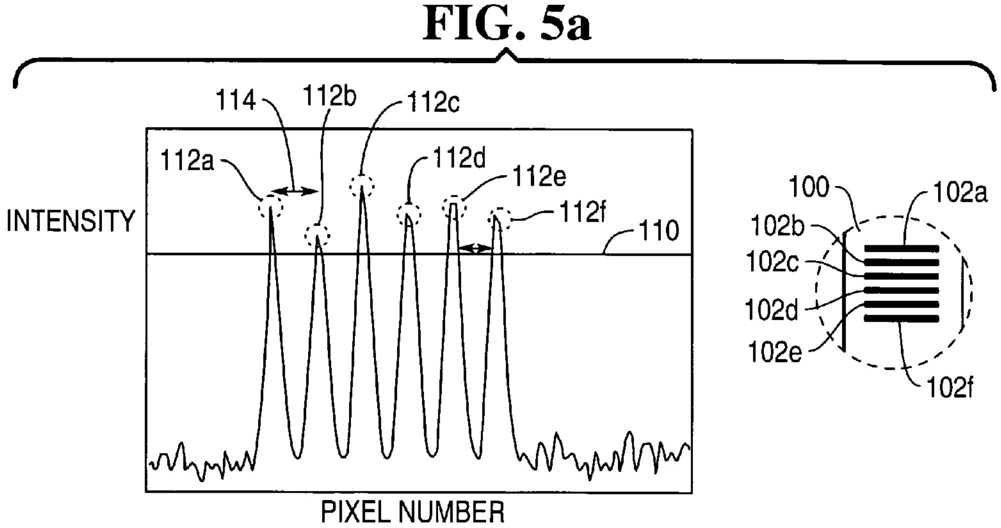
FIG. 5*a* is a graph of intensity versus pixel number for a line of pixels on the sensing arrangement of FIG. 2, and the relative size of the marker portions of FIG. 4.

Reference is now made to FIG. 5*a*, which is a graph of pixel intensity versus pixel number for a line of pixels on the CMOS sensor 44, and the relative size of the marker portions 112 as viewed by the CMOS sensor 44.

FIG. 5*a* relates to a measurement taken when the cassette 18 was full of banknotes 22 and the pusher plate 80 was furthest from the sensing station 23. In FIG. 5*a*, the predetermined threshold is illustrated by line 110. The processor 52 acquires data corresponding to the measured intensity detected by each pixel. The processor 52 then identifies those pixels that exceed the predetermined threshold to locate marker portion detection zones (illustrated by circles labeled 112*a* to 112*f*) on the array of pixels. The processor 52 then determines the spacing between adjacent marker portion detection zones, for example, between zone 112*a* and 112*b*. The processor 52 may determine the number of pixels between the marker zones 112. This may be achieved by determining the number of pixels between average centers of the marker zones 112 (illustrated by arrow 114), or the number of pixels between adjacent edges of the marker zones 112 (illustrated by arrow 116), or the number of pixels between any two other convenient reference points.

Once the processor 52 has determined the number of pixels between adjacent marker zones 112, the processor executes a scaling algorithm 118 resident in RAM 54 to convert the number of pixels to a number of banknotes 22.

In this example (FIG. 5*a*), adjacent marker zones 112 are separated by five pixels, which translates to the pusher plate 80 being approximately twenty-five centimeters from the sensing station 23 (which is the separation of the pusher plate 80 from the sensing station 23 when the cassette 18 is full of banknotes). This may correspond to the currency cassette 18 having approximately a thousand banknotes therein. The actual number of banknotes stored depends on the thickness and condition of the currency used.

Figure 5B:
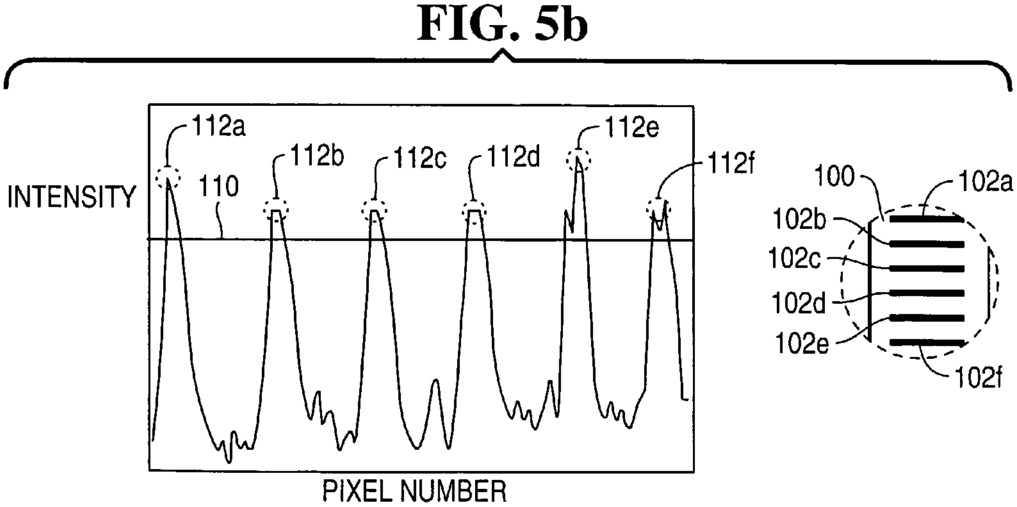
FIG. 5*b* is a graph of intensity versus pixel number for the same line of pixels on the sensing arrangement of FIG. 2 as for FIG. 5*a*, and the relative size of the marker portions of FIG. 4.

Reference is now made to FIG. 5*b*, which is a graph of intensity versus pixel number for the same line of pixels on the CMOS sensor 44 as for FIG. 5*a*, and the relative size of the marker portions 102 as viewed by the CMOS sensor 44. FIG. 5*b* relates to a measurement taken when the cassette 18 was nearly empty and the pusher plate 80 was closer to the sensing station 23. In FIG. 5*b*, the same predetermined threshold is used as for FIG. 5*a*.

The processor 52 analyses the measured intensity detected by each pixel in the same way as for the example of FIG. 5*a*, then identifies those pixels that exceed the predetermined threshold to locate marker portion detection zones (illustrated by circles labeled 112*a* to 112*f*) on the array of pixels. The processor 52 then determines the number of pixels between the marker zones 112. Once the number of pixels between adjacent zones has been determined, the processor 52 uses the scaling algorithm 118 to determine the position of the pusher plate 80.

In this example, adjacent marker zones 112 are separated by twelve pixels, which translates to the pusher plate 80 being approximately five centimeters from the sensing station 23. This may correspond to the currency cassette 18 having approximately fifty banknotes therein.

Figure 6:
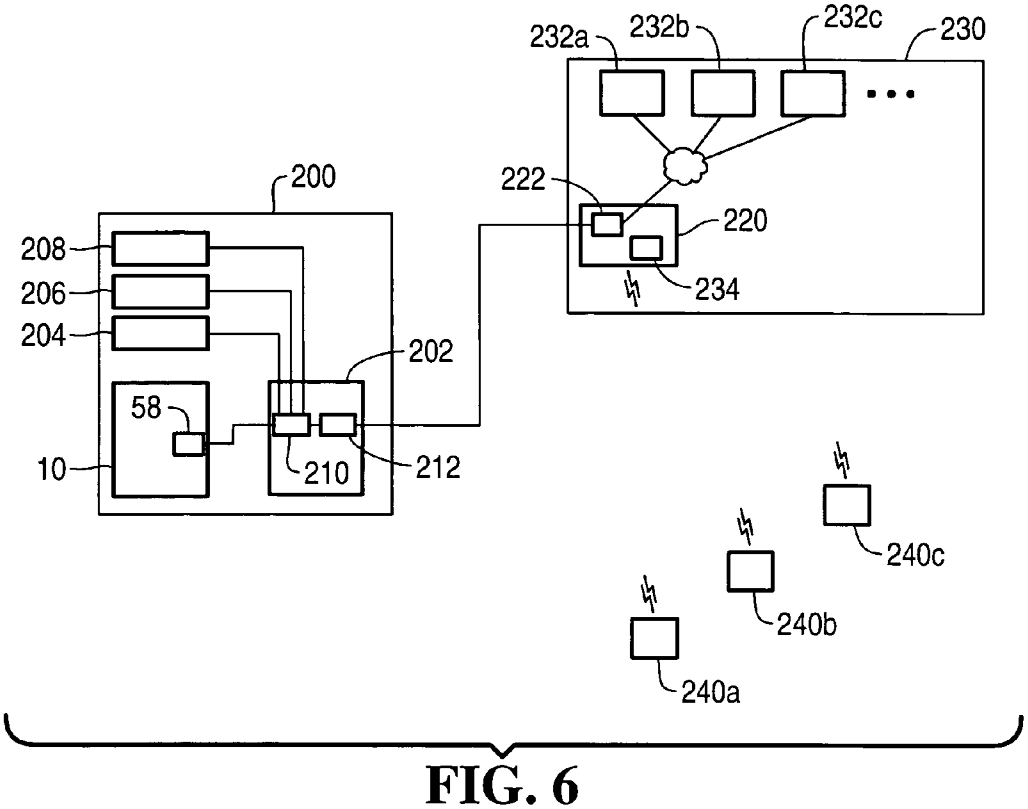
FIG. 6 is a simplified block diagram illustrating a self-service terminal including the media handler of FIG. 1.

Reference is now made to FIG. 6, which is a simplified block diagram illustrating an ATM 200 including the dispenser 10.

The ATM 200 includes a PC core 202, which controls the operation of peripherals within the ATM 200, such as the dispenser 10, a display 204, a card reader 206, an encrypting keypad 208, and such like. The PC core 202 includes a USB port 210 for communicating with the USB port 58 in the dispenser 10.

During operation, the PC core 202 periodically polls the dispenser 10, and/or the dispenser 10 notifies the PC core 202 of the number of banknotes remaining in each currency cassette 18 stored therein. In this embodiment, only one currency cassette 18 is used, but in other embodiments, multiple media cassettes may be used.

The PC core 202 includes an Ethernet card 212 for communicating across a network to a remote server 220. The server 220 has an Ethernet card 222 and is located within a management centre 230. The server 220 receives information about the amount of currency remaining in the dispensers (such as dispenser 10) from ATMs (such as ATM 200). This information is collated and used to schedule replenishment operations.

The management centre 230 includes a plurality of terminals 232 interconnected to the server 220 for monitoring the operation of a large number of such ATMs. The server 220 includes a wireless communication card 234 for communicating with wireless portable devices 240. These devices 240 are similar to portable digital assistants (PDAs).

In this embodiment, the server 220 is a Web server allowing password protected access to authorized personnel, such as field engineers and replenishment personnel issued with the portable devices 240, and human agents operating the terminals 232. The portable devices 240 may be installed in cash-in-transit vehicles to allow replenishment personnel to determine if any ATMs 200 require replenishment in advance of any scheduled replenishment operation.

Figure 7A:
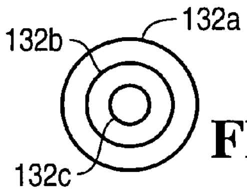
FIGS. 7*a* to 7*d* are schematic diagrams illustrating alternative configurations of the marker portions of FIG. 4.
Figure 7C:
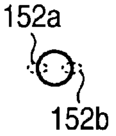
Figure 7B:
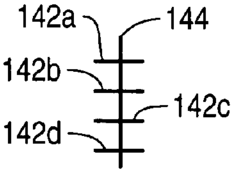
Figure 7D:
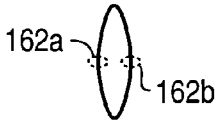

Reference is now made to FIGS. 7*a* to 7*d*, which illustrate different configurations of marker portions. In FIG. 7*a*, concentric circles are used as marker portions 132*a,b,c*. In FIG. 7*b*, a series of lines serve as marker portions 142*a* to 142*d*, and the lines have a perpendicular centre line 144 for aiding alignment. In FIG. 7*c*, a single circle is shown that has marker portions 152*a,b* diametrically opposite each other. In FIG. 7*d*, a single biconvex shape is shown that has marker portions 162*a,b* diametrically opposite each other.

It will now be appreciated that the above embodiment has the advantage that accurate information about the number of banknotes remaining within a currency cassette can be obtained by the dispenser 10 and relayed to a remote management centre to assist with scheduling currency replenishment operations.

Various modifications may be made to the above embodiments within the scope of the present invention. For example, in other embodiments, multiple pick modules may be included in each dispenser. In embodiments, where multiple pick modules are used, there may be an optical station for each pick module, or a single optical station having multiple optical paths, one optical path for each pick module.

In the above embodiment, the media items were currency items; whereas, in other embodiments financial documents, such as cheques, Giros, invoices, and such like may be handled.

In other embodiments, media items other than currency or financial documents may be dispensed, for example a booklet of stamps, a telephone card, a magnetic stripe card, an integrated circuit or hybrid card, or such like.

In other embodiments, a dispenser may have one or more cassettes containing currency, and one or more cassettes storing another type of media item capable of being removed by a pick unit.

In other embodiments, the imaging device may be located on a control board, in the pick module, or in some other convenient location. In other embodiments, the media handler may be a currency recycler, a ticket dispenser or depository, or such like.

In other embodiments, the light source may be in the form of any convenient illumination source, such as a very low power laser, a tungsten filament, or such like.

In other embodiments, the marker portions may comprise reflective material so that light incident from the light source is reflected by the reflective material.

In other embodiments, the calibrated configuration may be in the form of a circle, an ellipse, a square, a rectangle, a polygon, or such like. In other embodiments, the calibrated configuration may be in the form of a series of shapes, where each shape has the same outline but a different size (such as the concentric circles of FIG. 7*a*), or some or all of the shapes may have a different outline.

The transports described above comprise a combination of rollers and endless belts. The transports may also include one or more skid plates. These transports are all well known in the art, and different transports, such as gear trains, may be used with other embodiments of the present invention.

In other embodiments, other known types of image processing may be used to analyze images captured by the image sensor.

In other embodiments the scaling algorithm may be replaced by a table or some other mechanism for converting a number of pixels to a position or a number of banknotes.

In other embodiments, the processor may first convert a number of pixels into a position, then convert (using an algorithm, a table, or some other mechanism) the position to a number of banknotes or other media items. This has the advantage that different media items may be used in one media handler, but the same scaling algorithm or table may be used initially to determine the position of the moveable object, then another mechanism, specific to the media being estimated, may be used to estimate the number of media items therein.

What is claimed is:

1. In an Automated Teller Machine, ATM, which contains a controller which controls operation of components of the ATM, an apparatus comprising:

a) at least one cassette which contains currency which the ATM dispenses to a customer;

b) a door in the cassette through which currency is withdrawn when being dispensed to a customer;

c) a target within the cassette, which changes position as the currency in the cassette is depleted; and d) a sensor outside the cassette which takes a digital image of the target through said door, and provides the digital image to said controller.

2. ATM according to claim 1, wherein the cassette contains a pusher plate which pushes the currency toward the door, and the target is mounted on the pusher plate, in a position where the target is visible to the sensor.

3. ATM according to claim 1, wherein the currency in the cassette is located in a space between the sensor and the target.

4. ATM according to claim 1, wherein a light source outside the cassette illuminates the target prior to, or at the time of, taking the image.

5. ATM according to claim 1, wherein the controller processes the digital image to ascertain pixel-spacing between elements of the image and, based on the pixel-spacing, infers position of the target within the cassette.

6. ATM according to claim 1, wherein the controller uses the digital image to infer distance between the sensor and the target, and thereby compute amount of currency within the cassette.

7. ATM according to claim 6, wherein the controller computes different amounts of currency at different times.

8. ATM according to claim 1, wherein the cassette, when installed in the ATM, forms a closed contained which encloses the currency, with the exception of said door, which forms an opening in the closed container.

9. ATM according to claim 1, wherein the processor requires the digital image of the target in order to infer position of the target.

10. A method of operating an ATM, comprising:

a) maintaining a controller in the ATM which controls operation of components of the ATM;

b) maintaining at least one cassette in the ATM, which contains currency which the ATM dispenses to customers, said cassette containing a door through which currency is withdrawn when being dispensed to a customer;

c) maintaining a target within the cassette, which changes position as the currency in the cassette is depleted; and d) maintaining a sensor outside the cassette which takes a digital image of the target through said door, and provides the digital image to said controller.

11. ATM according to claim 10, wherein the cassette contains a pusher plate which pushes the currency toward the door, and the target is mounted on the pusher plate, at a location where the target is visible to the sensor.

12. ATM according to claim 10, wherein the currency in the cassette is located in a space between the sensor and the target.

13. ATM according to claim 10, wherein a light source outside the cassette illuminates the target prior to, or at the time of, taking the image.

14. ATM according to claim 10, wherein the controller processes the digital image to ascertain pixel-spacing between elements of the image and, based on the pixel-spacing, infers position of the target within the cassette.

15. ATM according to claim 10, wherein the controller uses the digital image to infer distance between the sensor and the target, to thereby compute amount of currency present in the cassette.

16. ATM according to claim 15, wherein the controller computes different amounts of currency at different times.

17. ATM according to claim 10, wherein the cassette, when installed in the ATM, forms a closed container which encloses the currency, with the exception of said door, which forms an opening in the closed container.

18. ATM according to claim 10, wherein the processor requires the digital image of the target in order to infer position of the target.

19. For an Automated Teller Machine, ATM, which contains a controller which controls operation of components of the ATM, an apparatus comprising:

a) at least one currency-storage cassette containing a door through which the ATM withdraws currency; and b) an optical target within the cassette, which i) is visible externally through the door, and cooperates with a camera external to the cassette to provide a target-image to the camera, ii) changes position as currency is depleted from the cassette, and iii) enables the controller to compute the amount of currency in the cassette, based on features of said image, which the controller uses to infer said position.

* * * * *

UNITED STATES PATENT AND TRADEMARK OFFICE

CERTIFICATE OF CORRECTION

PATENT NO. : 7,230,223 B2

APPLICATION NO. : 11/224178

DATED : June 12, 2007

INVENTOR(S) : Gunnar Jespersen and Eric G. Lyons

It is certified that error appears in the above-identified patent and that said Letters Patent is hereby corrected as shown below:

Column 9, Line 53, after “closed” delete “contained” and insert --container--.

Signed and Sealed this

Eighteenth Day of September, 2007

JON W. DUDAS

*Director of the United States Patent and Trademark Office*